United States Patent
Hernandez Hernandez et al.

(10) Patent No.: US 11,440,279 B2
(45) Date of Patent: Sep. 13, 2022

(54) METHOD FOR MANUFACTURING THREE-DIMENSIONAL ITEMS WITH FLEXIBLE WALLS

(71) Applicant: SIMPLICITY WORKS EUROPE, S.L., Elche (ES)

(72) Inventors: Adrian Hernandez Hernandez, Elche (ES); David Cremades Anton, Elche (ES)

(73) Assignee: SIMPLICITY WORKS EUROPE, S.L., Elche (ES)

( * ) Notice: Subject to any disclaimer, the term of this patent is extended or adjusted under 35 U.S.C. 154(b) by 364 days.

(21) Appl. No.: 16/469,393

(22) PCT Filed: Dec. 16, 2016

(86) PCT No.: PCT/ES2016/070902
§ 371 (c)(1),
(2) Date: Jun. 13, 2019

(87) PCT Pub. No.: WO2018/109242
PCT Pub. Date: Jun. 21, 2018

(65) Prior Publication Data
US 2019/0329511 A1    Oct. 31, 2019

(51) Int. Cl.
*B29D 35/10* (2010.01)
*B29D 35/04* (2010.01)
(Continued)

(52) U.S. Cl.
CPC ............. *B29D 35/10* (2013.01); *B29D 35/04* (2013.01); *B29D 35/128* (2013.01); *A43B 23/0215* (2013.01)

(58) Field of Classification Search
CPC . B29D 35/128; B29C 44/06; B29C 45/14344; B29C 45/14508;
(Continued)

(56) References Cited

U.S. PATENT DOCUMENTS 3,643,271 A * 2/1972 Wilkinson ........ B29C 66/81417
12/146 C
3,720,971 A   3/1973 Wyness et al.
(Continued)

FOREIGN PATENT DOCUMENTS

EP   2484240 A2   8/2012
EP   2764986 A1   8/2014
(Continued)

OTHER PUBLICATIONS

International Search Report for Corresponding International Application No. PCT/ES2016/070902 (3 Pages) (dated Jun. 28, 2017).

*Primary Examiner* — Francisco W Tschen
*Assistant Examiner* — Elisa H Vera
(74) *Attorney, Agent, or Firm* — Lucas & Mercanti, LLP

(57) ABSTRACT

A method for manufacturing three-dimensional items with flexible walls is provided, by method of a mold and counter-mold between which a volume corresponding to that of the item to be obtained is delimited. The item is made up of laminar parts which are mounted on a template that is fixed to the inner surface of the mold. The laminar parts are joined to one another by means of a material which is injected in molten state through a network of conduits delimited between the counter-mold, template and the facing edges of adjacent laminar parts. The template is made of an elastically deformable material and has a three-dimensional configuration.

16 Claims, 16 Drawing Sheets

(51) Int. Cl.
   *B29D 35/12*   (2010.01)
   *A43B 23/02*   (2006.01)
(58) Field of Classification Search
   CPC .... B29C 2045/14327; B29C 45/14377; B29C 2045/14131; B29C 44/145; B29C 2045/14532; B29C 2045/1454; B29L 2031/50; A43D 25/00; A43D 25/047; A43B 23/0255
   See application file for complete search history.

(56) References Cited

U.S. PATENT DOCUMENTS

| | | | |
|---|---|---|---|
| 2007/0180731 A1* | 8/2007 | Polegato Moretti | B29D 35/142 36/14 |
| 2009/0126225 A1* | 5/2009 | Jarvis | A43B 13/125 36/29 |
| 2011/0042847 A1* | 2/2011 | Ogawa | B29C 33/42 264/219 |
| 2012/0199277 A1 | 8/2012 | Loveder | |
| 2013/0152430 A1* | 6/2013 | Bier | A43B 7/125 36/3 A |
| 2013/0318833 A1* | 12/2013 | Izquieta Anaut | A43B 7/125 36/3 B |
| 2014/0246147 A1* | 9/2014 | Hernandez Hernandez | B29D 35/02 156/245 |
| 2015/0125696 A1* | 5/2015 | Fedorova | D04H 3/16 428/401 |
| 2016/0214471 A1* | 7/2016 | Bessho | B60J 5/0419 |
| 2019/0176366 A1* | 6/2019 | Tresse | B29C 45/14836 |

FOREIGN PATENT DOCUMENTS

| | | |
|---|---|---|
| WO | 2005025841 A1 | 3/2005 |
| WO | 2013050634 A1 | 4/2013 |

\* cited by examiner

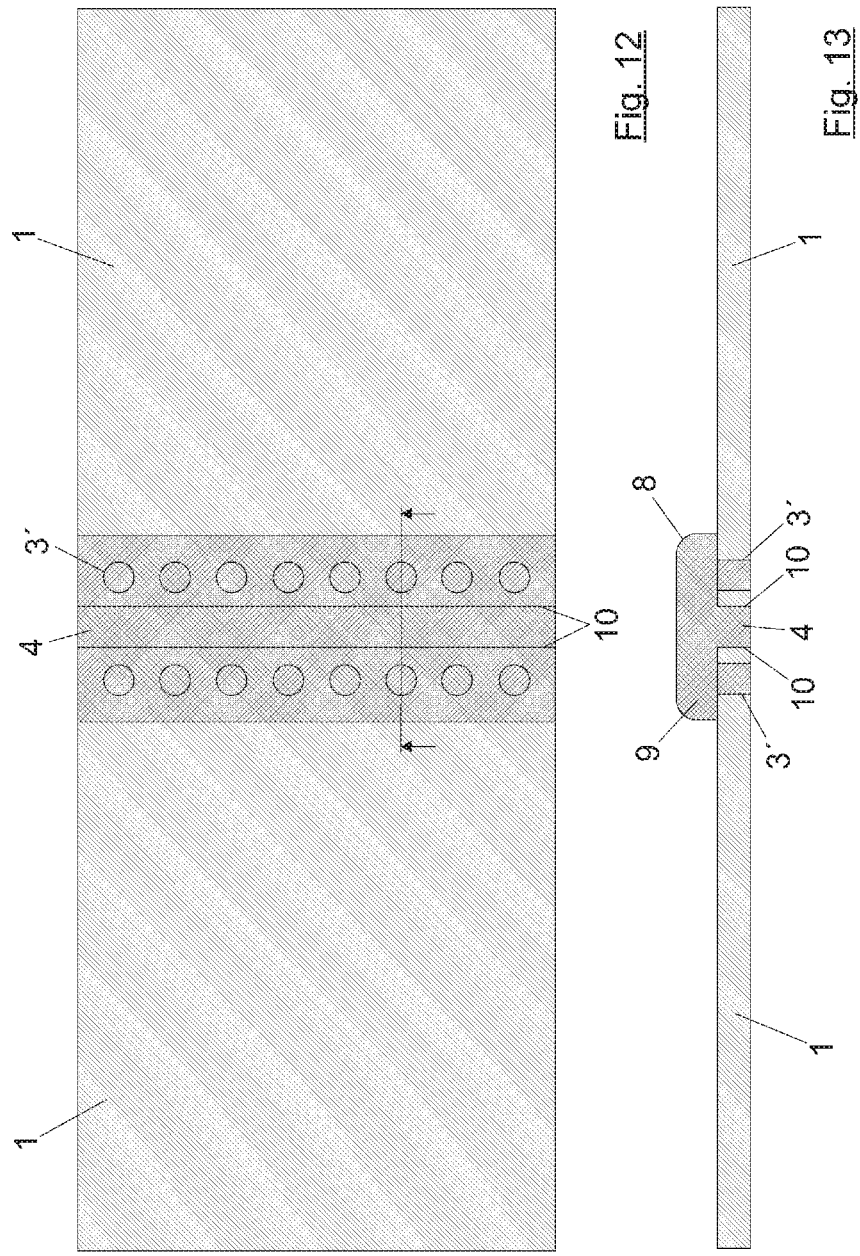

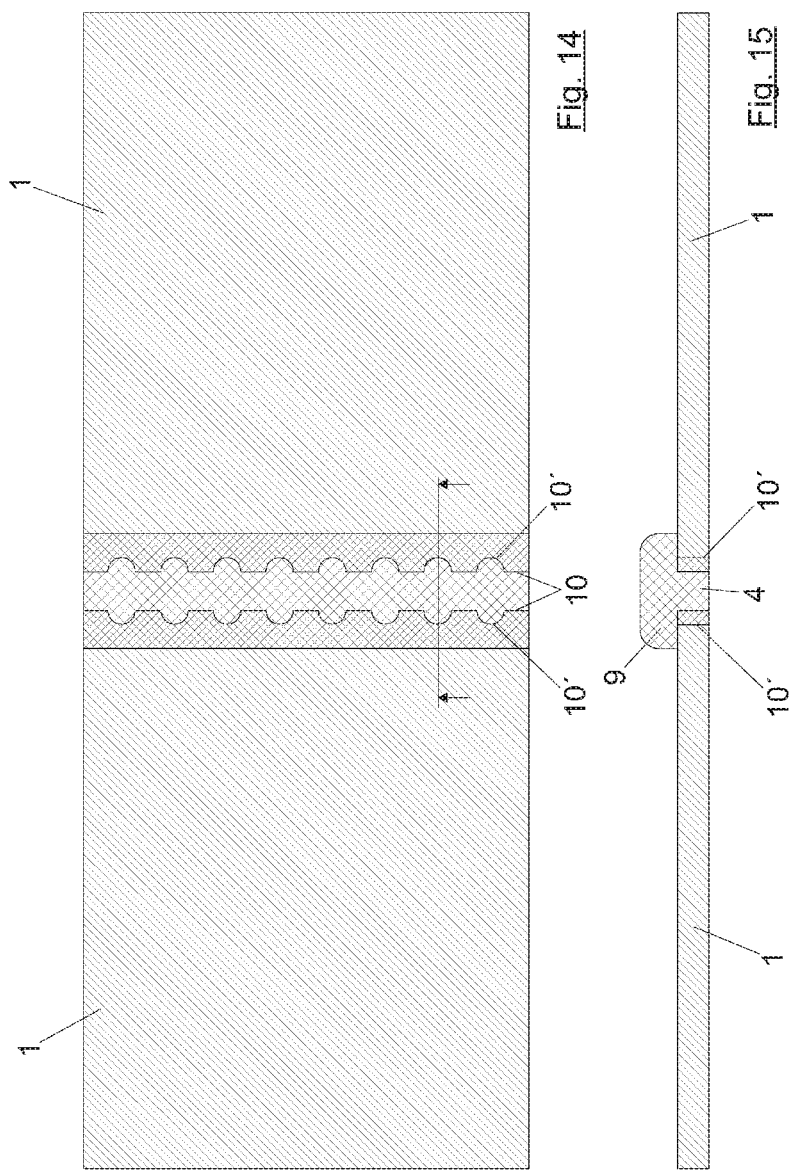

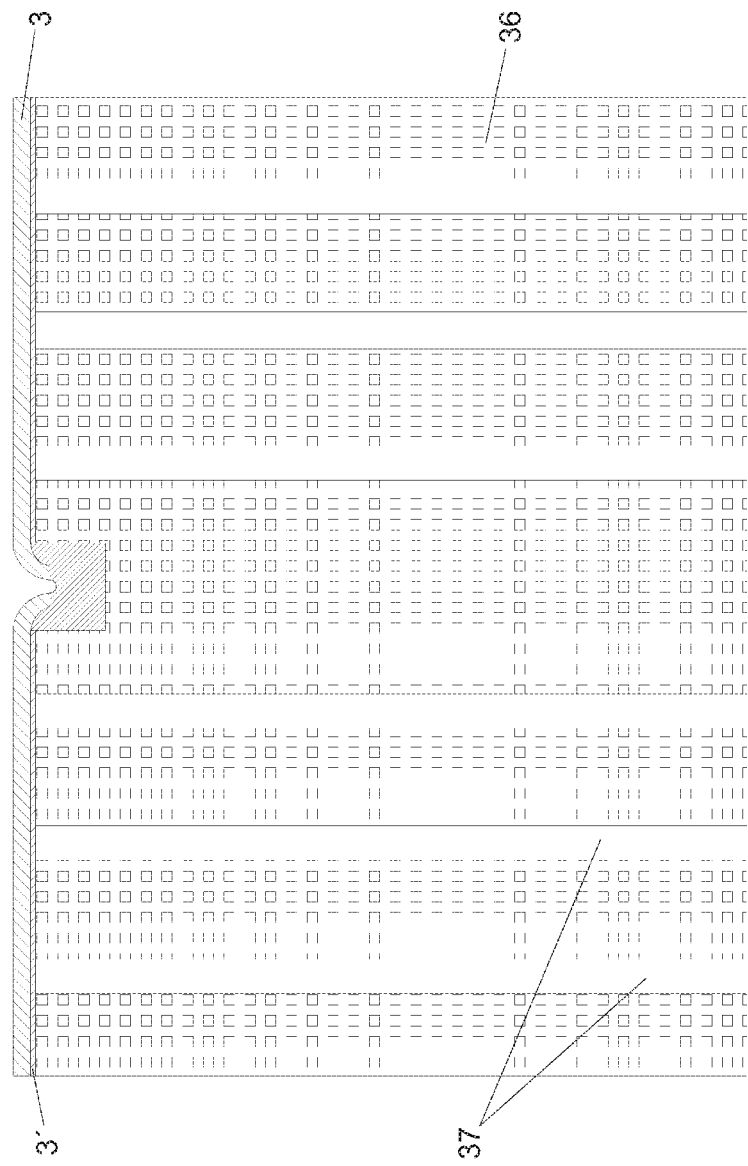

METHOD FOR MANUFACTURING THREE-DIMENSIONAL ITEMS WITH FLEXIBLE WALLS

CROSS REFERENCE TO RELATED APPLICATION

This Application is a 371 of PCT/ES2016/070902 filed on Dec. 16, 2016, which is incorporated herein by reference.

FIELD OF THE INVENTION

The present invention relates to a method for manufacturing three-dimensional items with flexible walls, such as footwear, handbags, clothing items, seating furniture, etc. and in general all types of items that are limited by a flexible outer wall made up of laminar parts of a flexible nature that are joined together by the facing edges thereof.

The method of the invention can be applied to the manufacturing of items with a flexible wall that may be provided with an inner lining, which can also be of a flexible nature and made up of laminar parts or not made up of laminar parts.

The method of the invention can also be applied to the manufacturing of items that comprise a flexible outer wall and which can include an inner wall or core of a semi-rigid nature for forming, for example, seating furniture, dashboards of vehicles, etc.

More specifically, the method of the invention is conceived for the manufacturing of items of the type that are exposed by means of a mould and counter-mould between which a volume corresponding to that of the item to be obtained is delimited, the item being made up of flexible laminar parts that are mounted on a flexible template that is attached to the inner surface of the mould, the laminar parts being joined to one another by an adhesive material that is injected in a fluid state through a network of conduits defined between the mould, flexible template and facing edges of the laminar parts.

BACKGROUND OF THE INVENTION

Traditional manufacturing of three-dimensional items with flexible walls, such as footwear, vehicle seats, handbags, etc. is done by consecutively joining the parts that make up the same, one by one, by sewing, heat-sealing, etc., which requires a large workforce and does not provide three-dimensional stability to the item obtained. Furthermore, the design and comfort of the item obtained is limited, due to the fact that the connections between the consecutive parts, either by sewing or gluing, require the overlapping of the edges of the parts being joined.

Additionally, the seams require holes through which the thread of the seams passes, holes that constitute a means for the penetration of water. When the item to be obtained must be impermeable, it is necessary to use linings made with special membranes, inner sealing tape, etc., all of which entails higher manufacturing costs.

Through PCT/ES2012/070139, a method for producing flexible three-dimensional items by means of a mould and counter-mould between which a chamber is delimited with the shape and volume of the item to be obtained is known. This item is made from laminar parts, the facing edges of which are slightly separated. The laminar parts are arranged between the mould and counter-mould, which are separated from one another a distance approximately equal to the thickness of said laminar parts. Between the facing edges of the adjacent laminar parts, the mould and counter-mould determine conduits and volumes through which a plastic material in a fluid state is injected which, by solidifying, serves as a means for joining the laminar parts. To facilitate the placement of the laminar parts that form the item to be obtained, a flexible laminar template may be used, on which said pieces are fixed, duly positioned, and then the template is fixed, by the free surface of the laminar parts, to the surface of the mould.

The use of the flexible laminar template facilitates the placement of the laminar parts that will configure the item to be obtained out of the mould, and the fact that it is flexible allows for the deformation thereof, facilitating the introduction of the counter-mould.

The fixing of the laminar parts on the template is usually done using an adhesive. This fixing system requires great accuracy in positioning the laminar parts on the template and a considerable amount of time.

On the other hand, in the use of an adhesive as a means for fixing the laminar parts, when said parts are porous or permeable, they are impregnated with the adhesive, which prevents the use of the template with these types of laminar parts.

When the laminar template encases the counter-mould, in the demoulding process it must be cut in order for it to be extracted, which means it must be destroyed, preventing the reuse thereof.

Another drawback of the use of laminar templates is the possible lack of sealing on the limits of the conduits through which the plastic material in a fluid state is injected.

This circumstance means that, when closing the mould, the laminar template does not provide a tightness and complete closure of the cut parts. As a consequence, the material injected, in a fluid state, can penetrate between said template and the cut parts, producing a surface contamination on said parts.

DESCRIPTION OF THE INVENTION

The object of the present invention is to eliminate the aforementioned problems by means of a method for manufacturing three-dimensional items with flexible walls, of the previously mentioned type, which includes the use of a three-dimensional flexible template, from an elastically deformable material, which, given that said template is compressed between the mould and counter-mould, allows for a perfect sealing of the edges or limits of the conduits through which plastic material is injected in a fluid state.

With the aforementioned constitution, the template can be deformed by the counter-mould being mounted, thereby facilitating the mounting of the assembly.

Another advantage is that the template will serve as a means for securing the laminar parts between the mould and counter-mould.

According to the invention, the template has a three-dimensional configuration and reproduces, at least on the surface on which the laminar parts are arranged, the shape of the item being manufactured, said template being obtained by means of moulding from an elastically deformable material, such as silicone.

The wall of the aforementioned template will have a greater thickness than the distance between the surface of the mould and the facing surface of the flexible laminar parts, at least throughout the part of the areas that limit the channels through which the plastic material in a fluid sate will be injected, such that by mounting the counter-mould, the edges of the flexible laminar parts are compressed against the mould, thereby sealing the channels.

The template with the previously described constitution can have grooves on the surface facing the flexible laminar parts and in coincidence with channels through which the plastic material in a fluid state will be injected, which are preferably wider than the channels. The facing channels and grooves define conduits with a greater cross section, which allow joining cords with a greater cross section to be obtained between the facing edges of the adjacent laminar parts, the edges of the laminar parts being occluded in said cords, preferably if said edges are recessed.

According to another variant embodiment, the template can have, on the surface intended for receiving the laminar parts, ribs that limit the channels defined between the facing edges of the adjacent laminar parts, ribs which, by mounting the counter-mould, will be compressed, providing the sealing of the conduits through which the plastic material will be injected in a fluid state. In the same way, and for the same purpose, the grooves of the template can also be limited by longitudinal ribs.

With the constitution described, the template, with the flexible laminar parts on the same, can be mounted on the counter-mould and, by coupling the mould, the sealing of the network of conduits is achieved, along the edges thereof, preventing the material injected in a fluid state from exceeding the limits of the network of channels.

In the method of the invention, the flexible laminar template, generally obtained by thermoforming, is substituted with a template with a non-laminar structure, of a three-dimensional configuration and preferably obtained by moulding of an elastically deformable material, which can have different textures on the surfaces thereof to achieve different effects in the injected plastic material, once it has solidified.

Furthermore, the template can have differences in the design of the inner and outer surfaces thereof.

By means of the use of the three-dimensional template described, the flexible laminar parts that make up the wall of the item to be obtained are held between the template and the counter-mould, ensuring their positioning during the injection of the material in a fluid state, without it being necessary for said parts to be previously fixed to the template, for example by means of an adhesive, as is the case with the flexible laminar template of the prior art.

By being able to create edges of the flexible laminar parts occluded in the cords connecting the adjacent parts, especially in the mentioned case in which the templates have grooves coinciding with the channels that separate the facing edges between the adjacent laminar parts, the placement of said laminar parts on the template requires less precision than if the template were a laminar structure, since the edges of said parts would be hidden in the joining cords.

The manufacturing of the template, made from an elastically deformable material, allows for angles, edges and general shapes to be obtained with greater accuracy than in the use of laminar templates.

The high deformation capacity of the three-dimensional template of the invention, made from an elastically deformable material, facilitates both the mounting and dismounting thereof, without the need to have to make cuts, which consists of a considerable improvement with respect to known laminar templates.

By being a three-dimensional template, in other words with a certain thickness, of a flexible nature and elastically deformable, it allows the pressure exerted on said template, for example by closing mould against mould, to be transmitted to the laminar parts in a perpendicular direction to the same, which, in addition to ensuring the sealing between the template and the laminar parts, ensures and maintains the positioning of said parts, without the risk of the movement of the same.

The nature of the template, made from an elastically deformable material, allows for the reuse thereof, avoiding recycling operations, as well as possible undesired negative environmental impacts.

By means of the method of the invention, items can be obtained in which the connections between the laminar parts that form the cut serve as decorative elements, due to both the tracing and the colour thereof.

The method of the invention also allows items with three-dimensional memory to be obtained, which will generate an excellent adaptation and comfort for the user.

BRIEF DESCRIPTION OF THE DRAWINGS

An exemplary embodiment is shown in the attached drawings, wherein:

FIGS. 12 to 15 show plan and cross-sectional views of other possible variant embodiments.

FIGS. 26 to 29 show successive steps in the manufacturing of a seat by means of the method of the invention.

DETAILED DESCRIPTION OF AN EMBODIMENT

Figure 1:
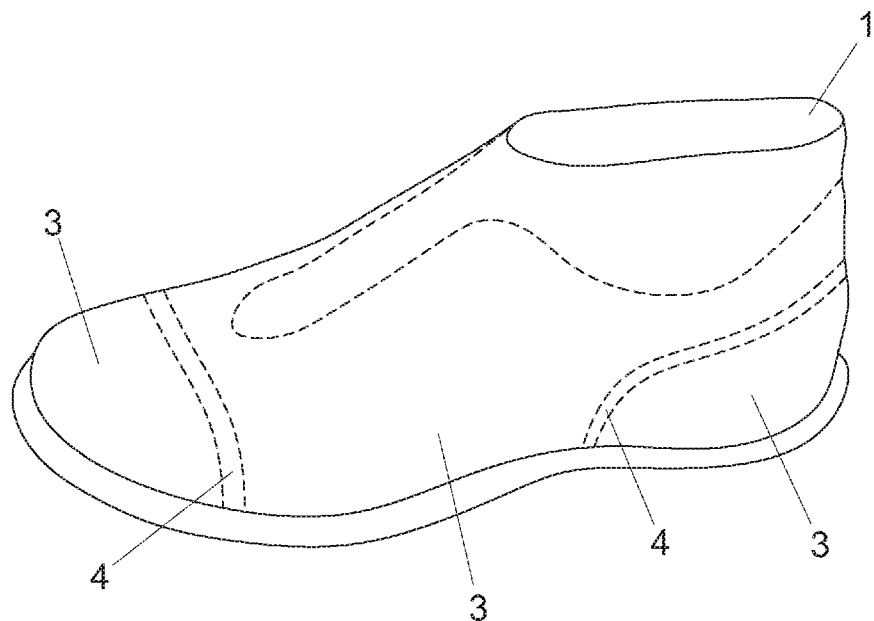
FIG. 1 shows a perspective view of a laminar template made according to the invention for obtaining a shoe.

FIG. 1 shows a three-dimensional template (1) for manufacturing a shoe by means of a mould and counter-mould between which a volume corresponding to that of the item to be obtained is delimited. The present case deals with obtaining a shoe.

Figure 2:
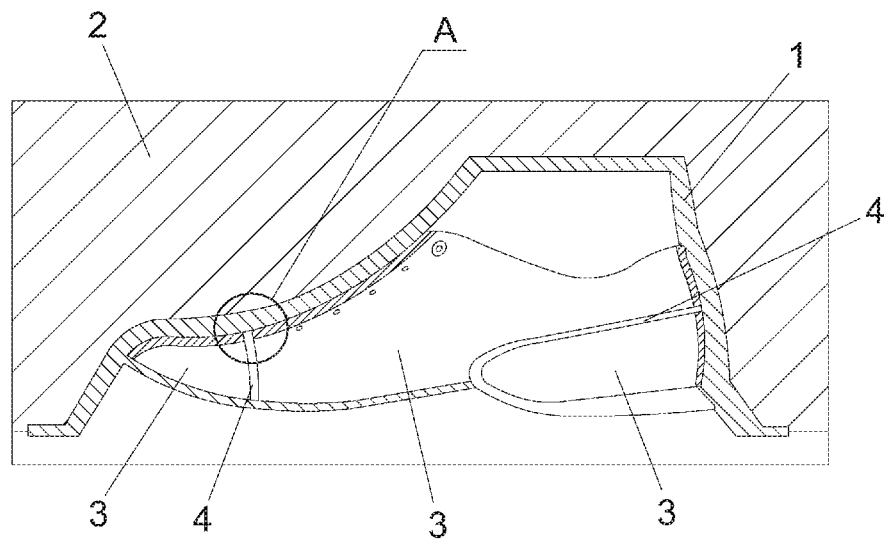
FIG. 2 shows a longitudinal cross-sectional view of the laminar template of FIG. 1 coupled to the mould for obtaining a shoe.

As shown in FIG. 2, the template (1) is applied on the concave surface of the mould (2), and once arranged on the same, on the inner surface thereof, the laminar parts (3) will make up the cut of the shoe, parts that are separated from one another to delimit channels (4) between the facing edges thereof. The template (1) will reproduce, at least on the surface on which the laminar parts (3) are applied, the shape of the item to be obtained.

The template (1) is made up of an elastically deformable material and can be obtained by means of a mould made of silicone, for example.

Once the template (1) with the shape of the item to be manufactured is obtained, the laminar parts (3) that will form the cut of the shoe are cut, which are placed on the inner surface of the template (1) with the edges of the adjacent parts facing each other and separated to delimit channels (4) between the same. The template (1) is then coupled to the laminar parts (3) in the mould (2), which can be made up of one, two or more parts. Lastly, the counter-mould, not shown, is coupled in the template (1) on the laminar parts (3). In the present case, the counter-mould will adopt the shape of a last and will close the mould.

The last or counter-mould can also hold the silicone template, at least in specific areas, in which it is necessary or convenient for the surface of the laminar parts aimed at the counter-mould to efficiently seal said counter-mould. On the other hand, the arrangement of the elastically deformable template on the mould and counter-mould eliminate the risk of contamination or penetration of the fluid injected in the parts that will make up the item to be obtained, especially when said parts are permeable to the injected fluid.

Figure 3:
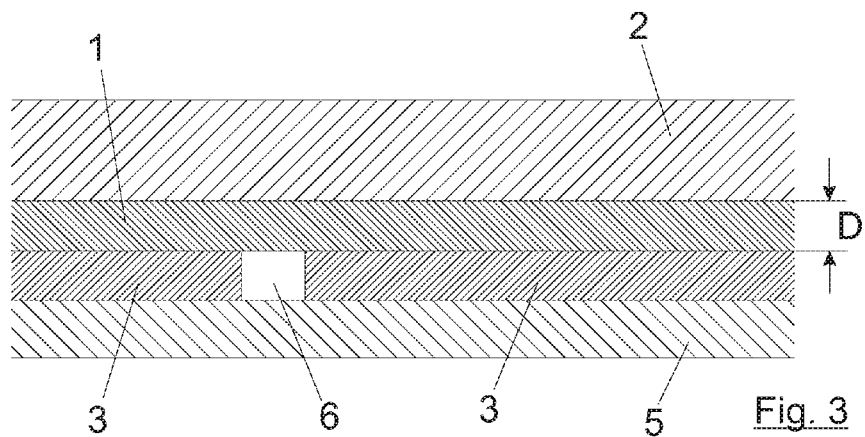
FIG. 3 corresponds to detail A of FIG. 2 on a larger scale.

The channels (4) are closed on the outside by the template (1) and on the inside by means of the counter-mould (5), FIG. 3, forming a network of conduits (6) through which an adhesive product is injected in a fluid state which, by solidifying, serves as a means for joining the facing edges of the adjacent laminar parts (3).

Figure 4:
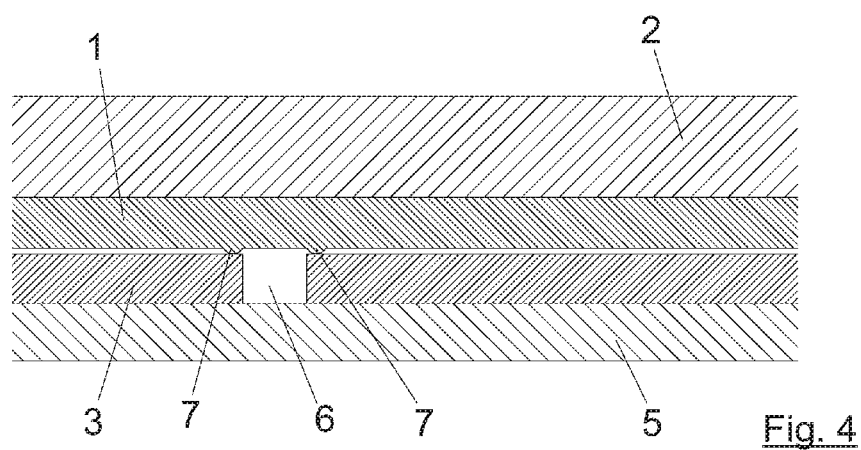
FIGS. 4 to 7 are similar views to that of FIG. 3, showing possible variant embodiments.

According to the invention, the template (1) is obtained from an elastically deformable material, such as silicone, and will have a greater thickness than the distance "D" between the mould (2), FIG. 3, and the laminar parts (3), at least at the edges of said laminar parts, such that said edges are compressed against the counter-mould (5), thereby ensuring the seal of the conduits (6) throughout the same. This feature can be achieved by increasing the thickness of the template only in the areas that limit the conduits (6). For example, by means of ribs (7), FIG. 4, that run on one side and on the other side of said conduits and which by being pressed against the laminar parts (3), by the template compressing due to the tightness between the mould (2) and counter-mould (5), provide the longitudinal seal to the conduits (6).

Figure 5:
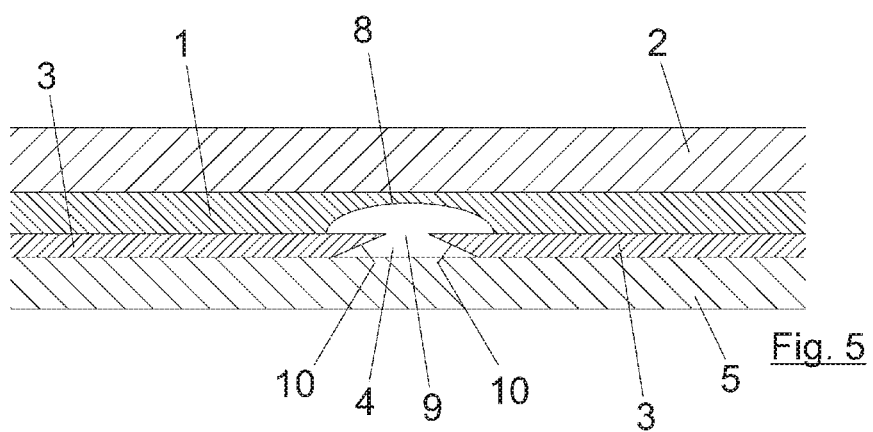

As can be seen in FIG. 5, the template (1) can have grooves (8) that run in coincidence with the channels (4), limited between the facing edges of the adjacent laminar parts (3), said grooves (8) having a greater thickness than the channels (4), thereby increasing the cross section of the joining cord (9), formed by the adhesive material injected through the conduits (6) once it is solidified. Furthermore, the facing edges (10) of the adjacent laminar parts (2) can be recessed to be occluded in the cord (9), which will conform the injected material, which will increase the adhesive surface and hide said edges. In this case, the recessed edges will be pressed against the template (1), the vacuum fastening system of the laminar parts (2) being important at that moment, at least in the areas near these recessed edges, or by means of the temporary fastening with adhesive, all with the aim of maintaining the connection of the laminar parts with the template during the injection process.

Figure 6:
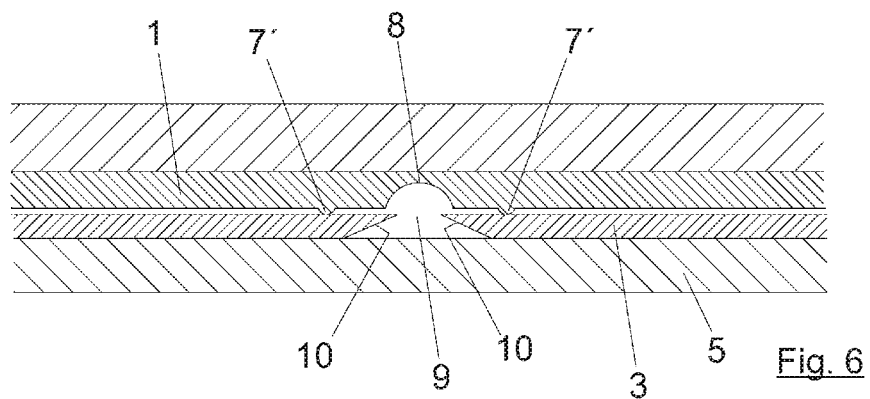

As can be seen in FIG. 6, the groove (8) of the template (1) can be limited by ribs (7') with a similar function to that of the previously described ribs (7).

Figure 7:
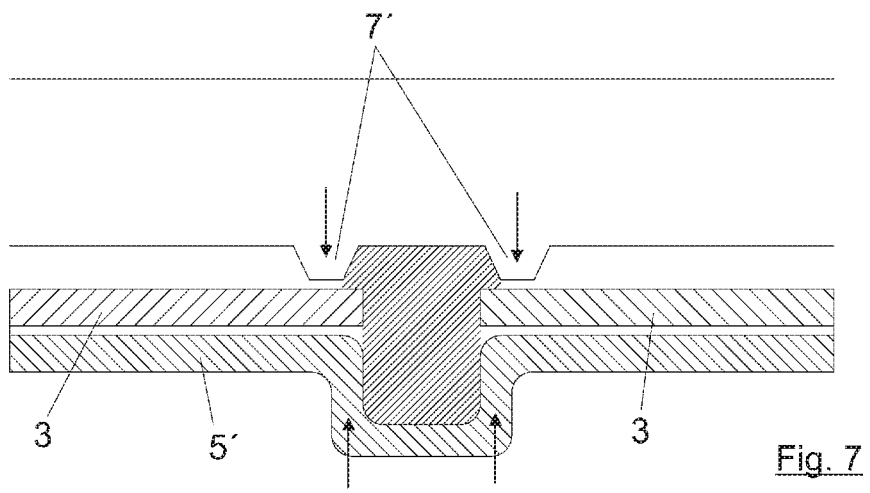

In the embodiment of FIG. 7, the laminar parts (3) are situated between the three-dimensional template (1), made of elastically deformable material, and the counter-mould (5') formed, for example, by a sheet made of plastic material. This counter-mould, in a position coinciding with the separation between the facing edges (10) of the laminar parts (3), forms a channel (8'). In turn, the three-dimensional template (1) has ribs (7') near the edges (10'). With this constitution, by treating or solidifying the injected adhesive material, joining cords (9') with a large cross section and strong resistance are obtained, which will project through the back of the wall of the item obtained. At the same time, by closing the mould and counter-mould, the ribs (7') compress the edges of the laminar parts (3) against the counter-mould (5'), providing a secure closure between these components, preventing the injected material in a molten state from flowing between the same.

Figure 8:
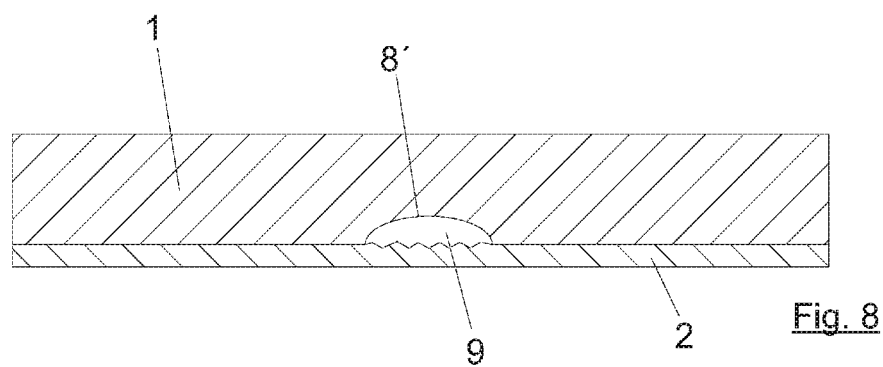
FIGS. 8 to 11 show cross sections of possible constructive details.

On the surface of the laminar parts (3), decorative cords (8') can be applied, FIG. 8, made from the same adhesive material that will be injected through the grooves (8), FIG. 5, made in the template (1).

Figure 9:
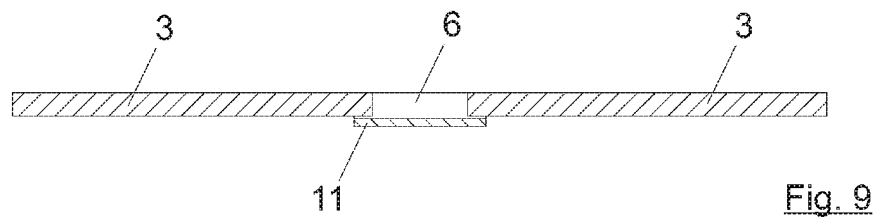
Figure 10:
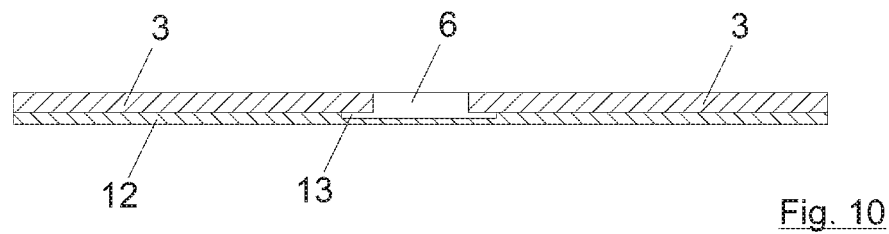

The joining of the facing edges of the adjacent laminar parts (3) can be reinforced, for example by means of the arrangement of an auxiliary sheet (11), FIG. 9, in coincidence with the conduits (6), by the hidden surface of the product to be obtained. This auxiliary sheet can only run in coincidence with the conduits (6) or cover the entirety of the surface of the parts (2), such as a lining (12), FIG. 10, said lining able to have a recess (13) in coincidence with the aforementioned conduits.

Figure 11:
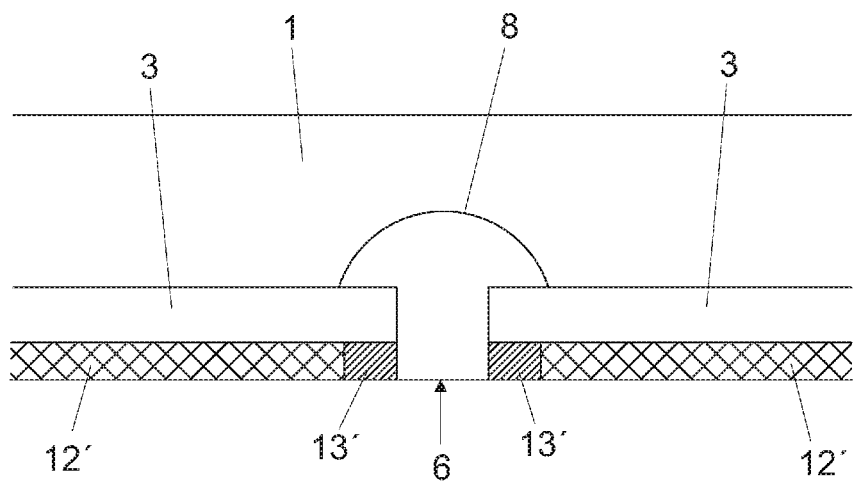

Also, as shown in FIG. 11, on the laminar parts (3), in coincidence with the edges thereof, a fabric sheet (12') can be applied, which in the areas (13') adjacent to the conduits (6) will be impregnated with the adhesive product injected through said channels, to serve as a joining means between the fabric sheets (12').

As shown in FIGS. 12 and 13, the laminar parts (3) can have holes (3") close to the edges (10) thereof, which are in communication with the grooves (8), coinciding with the channels (4). This way, the injected adhesive material that will form the cords (9) will fill the holes (3") and by solidifying will act as rivets that serve as mechanical joining means between the laminar parts (1).

As a variant, FIGS. 14 and 15, the edges (10) of the laminar parts (1) can have facing slits (10") that increase the length of the facing edges to be joined of the adjacent laminar parts (1).

The method of the invention is applicable to obtaining three-dimensional items that can be made up of a flexible outer layer or wall and a rigid or semi-rigid inner layer or filler, and which can consist of a piece of furniture, a dashboard of a vehicle or similar.

Figure 16:
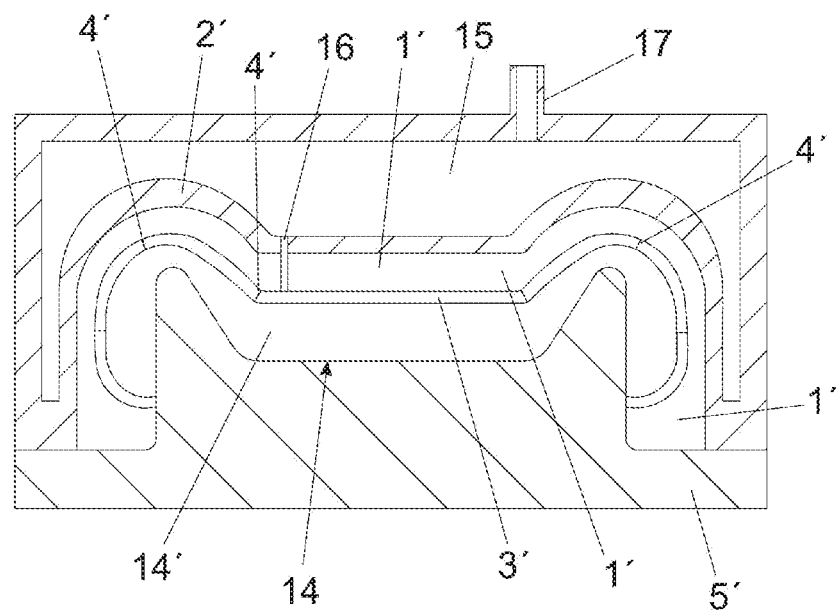
FIG. 16 is a similar view to that of FIG. 2, showing another variant embodiment.

To this end, as shown in FIG. 16, on the inner surface of the mould (2") the template (1") made of elastically deformable material is applied, which will hold the laminar parts (3") that will make up the outer wall of the item to be obtained and which are separated by separations lines (4"). The counter-mould (5") is applied to the mould (2"), and between the same and the laminar parts (3") is a chamber (14) in which a material in a fluid state is injected, which once solidified will make up a support (14") that joins the laminar parts (3") that make up the outer wall of the item, made up of laminar parts (3"). The counter-mould (5") could even form part of the final item obtained. With this system for joining the laminar parts (3"), the item obtained will lack protrusions or outer ribs, as well as separations between said laminar parts.

The mould (2") could form a chamber (15), the inner wall of which, as well as the template (1"), could have coinciding holes (16) through which, and by means of a vacuum created through the nozzle (17), the parts (3") will be fixed to the template (1").

The template (1") can have a different design on the inner and outer surfaces thereof and is deformable, all of which facilitates both the mounting and dismounting of the mould, as well as the mounting of the counter-mould, all without the need to have to break the template.

Figure 17:
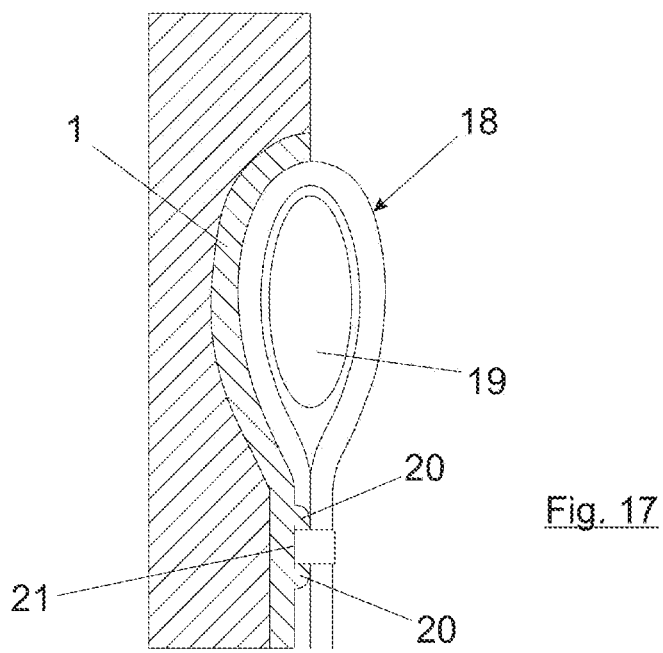
FIG. 17 shows a cross section of the mould of the shoe, obtained through the method of the invention.

In the manufacturing of certain types of items, for example footwear, parts of different material can be placed. FIG. 17 shows the neck (18) of a shoe formed by the same material as the laminar parts that form the cut, which encases the foam part (19) and which, in turn, remains inside the template (1), which has ribs (20) that limit a hole (21) in which the adhesive that closes the neck (18) will be injected, preventing the contact thereof with the foam (19).

Lastly, it must be mentioned that on at least part of the surface of the counter-mould, regardless of the item to be obtained, the template of elastically deformable material can be arranged.

Figure 18:
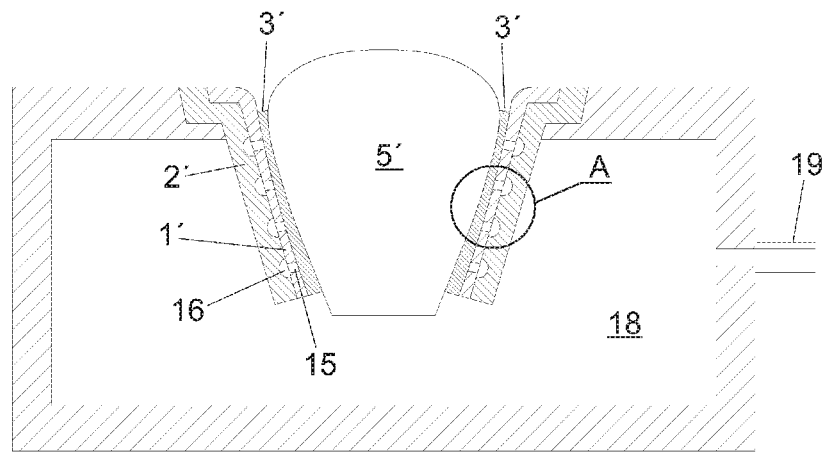
FIG. 18 is a similar view to that of FIG. 16, showing another variant embodiment.

In a similar way to that which is described in reference to FIG. 11, FIG. 18 shows a mould (2") on which the three-dimensional template (1") has been applied, made of elastically deformable material, which holds the parts (3") that form the cut.

Figure 19:
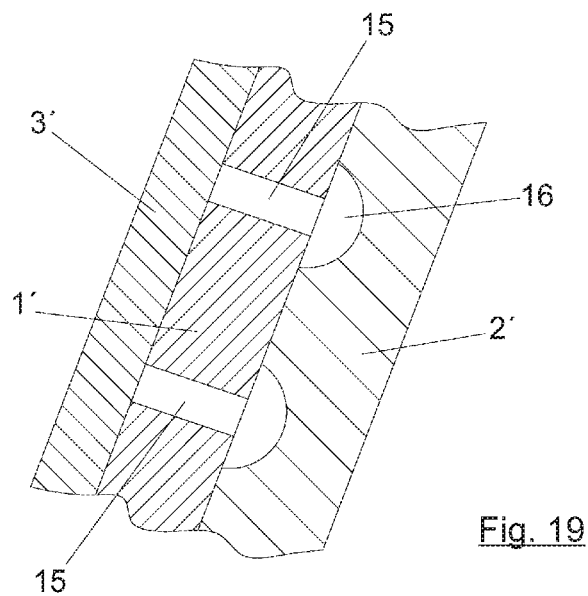
FIG. 19 corresponds to detail A of FIG. 18 on a larger scale.

The template (1"), FIGS. 18 and 19, can be provided with holes (15) through which a vacuum can be applied that will serve as a means for fastening the parts (3"). In turn, the mould (2") could have a network of small channels (16) with which the holes (15) will coincide. The small channels (16) will be in communication with a vacuum source, for example, through a chamber (18) with a connection nozzle (19). This way, the vacuum effect is applied uniformly to all of the parts (3") and with it the effect of fastening said parts to the template (1").

Figure 20:
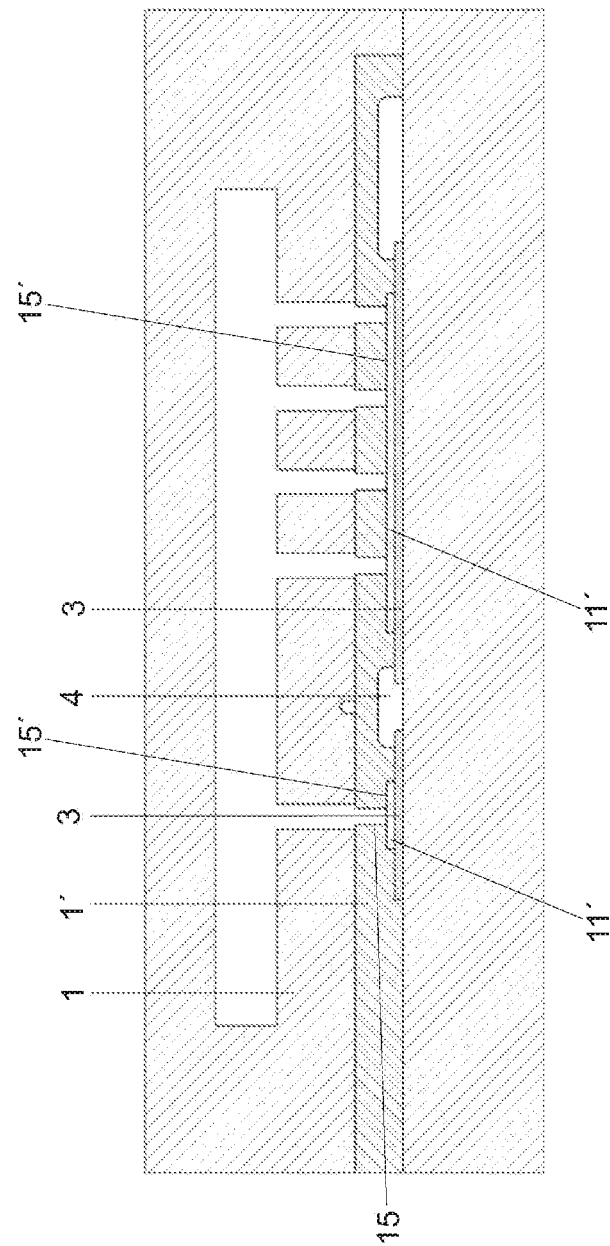
FIG. 20 shows a cross section of a variant embodiment of the vacuum fastening system of laminar parts.

FIG. 20 shows a cross section of a possible variant in which in the template (1"), around the mouth of the holes (15), a peripheral hollow (15") is made, in which microfibre parts (11") are placed, through which the aspiration produced by the vacuum applied through the holes (15) is carried out. This way, a greater aspiration area of the laminar parts (3) and an improved closure against the loss of air is achieved.

Figure 21:
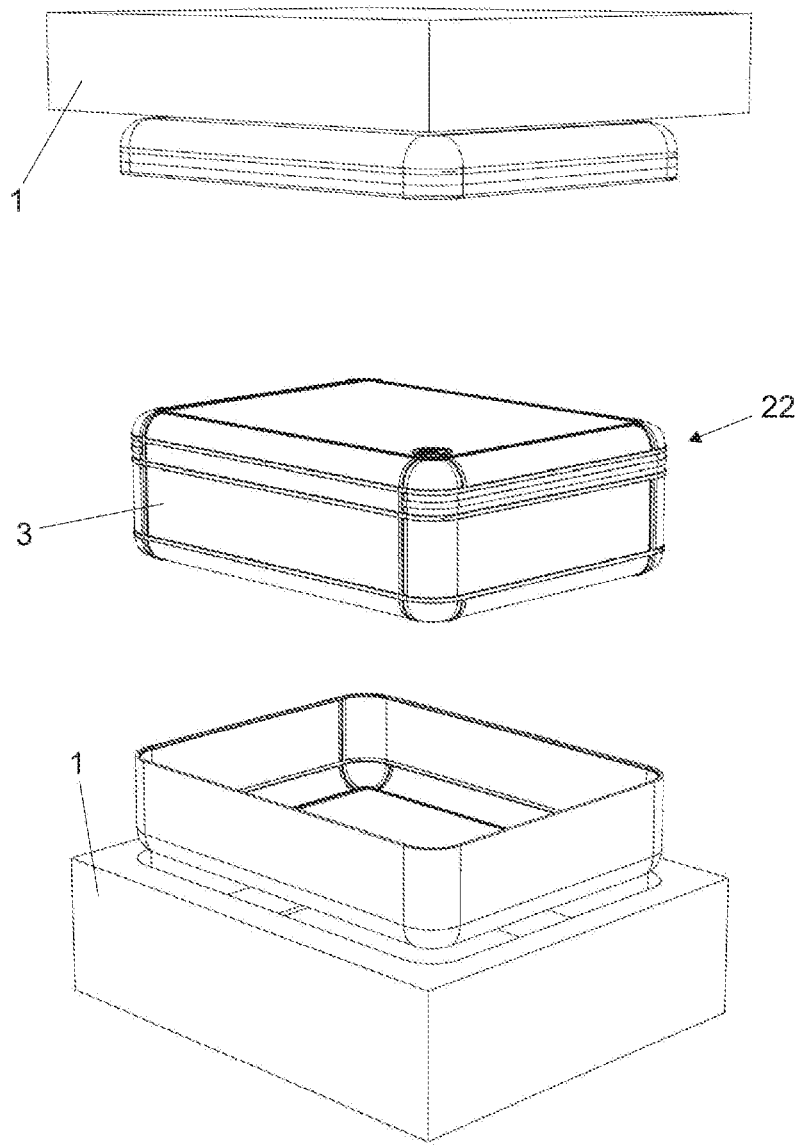
FIGS. 21 to 24 show another set of exemplary embodiments.
Figure 22:
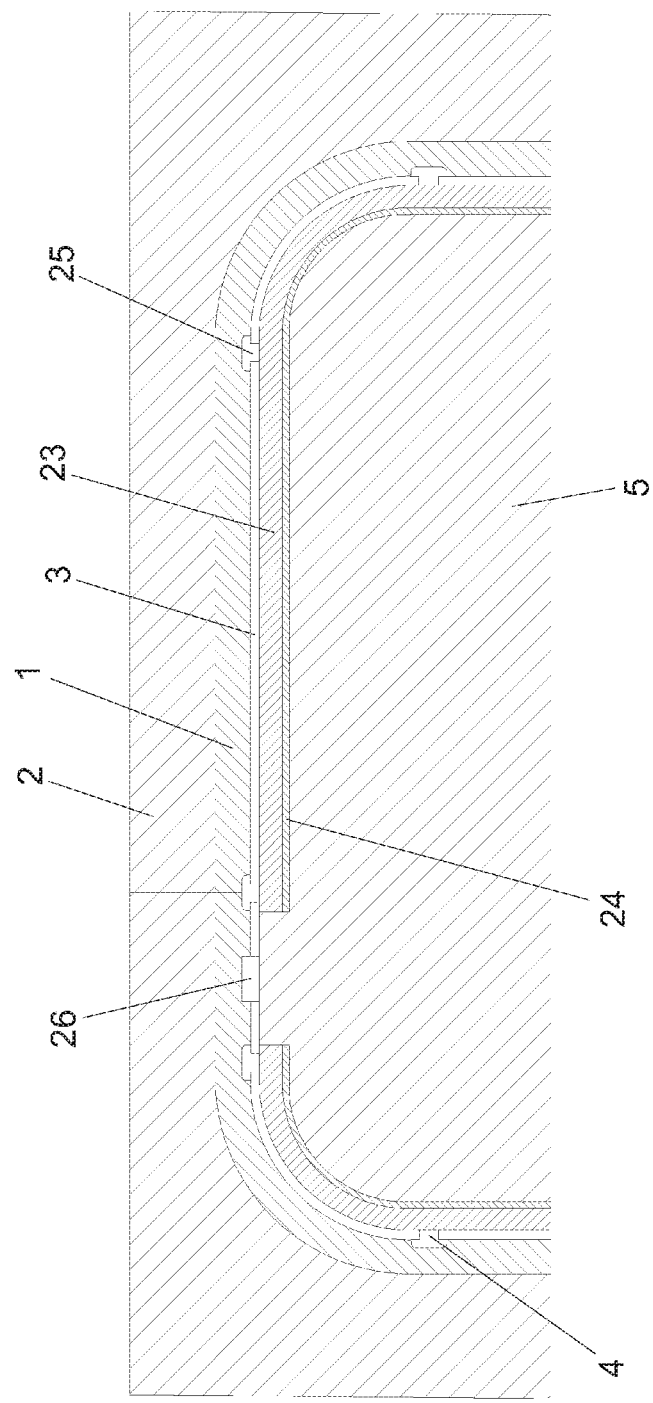

FIGS. 21 and 22 show the manufacturing of a briefcase (22) by means of the method of the invention. On the inner surface of the mould (2) the three-dimensional template (1) is arranged, which holds the laminar parts (3) which form the visible surface of the briefcase. On these laminar parts a reinforcement sheet (23), for example made of a plastic material, is applied, on which an inner lining (24) is arranged, supported by the counter-mould (5). In the channels (4) delimited between the consecutive laminar parts (3), the adhesive material that will form the joining cords (25) is injected. Also shown is the arrangement of a zipper (26) as a means for closing the briefcase.

Figure 23:
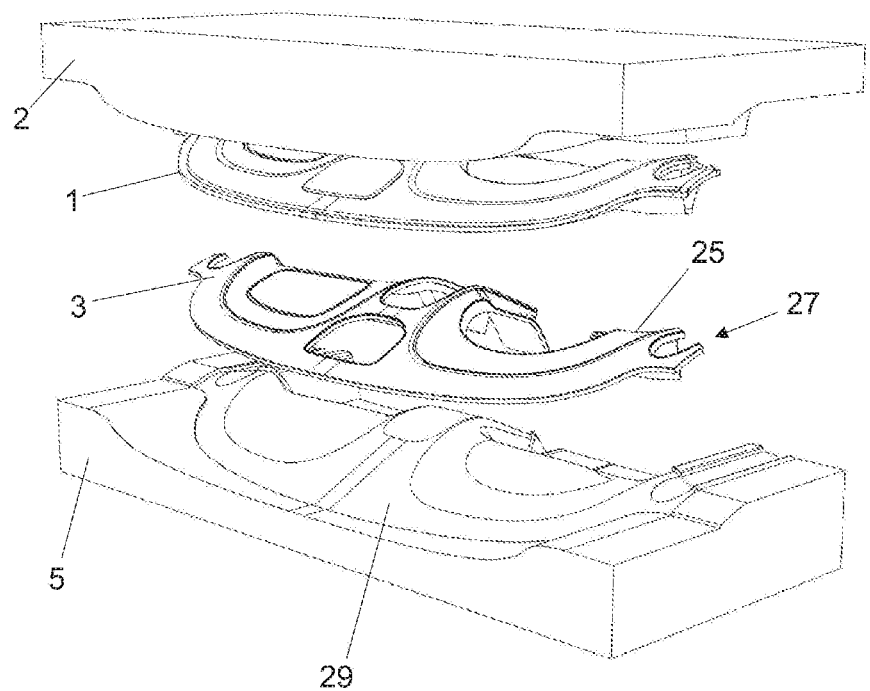
Figure 24:
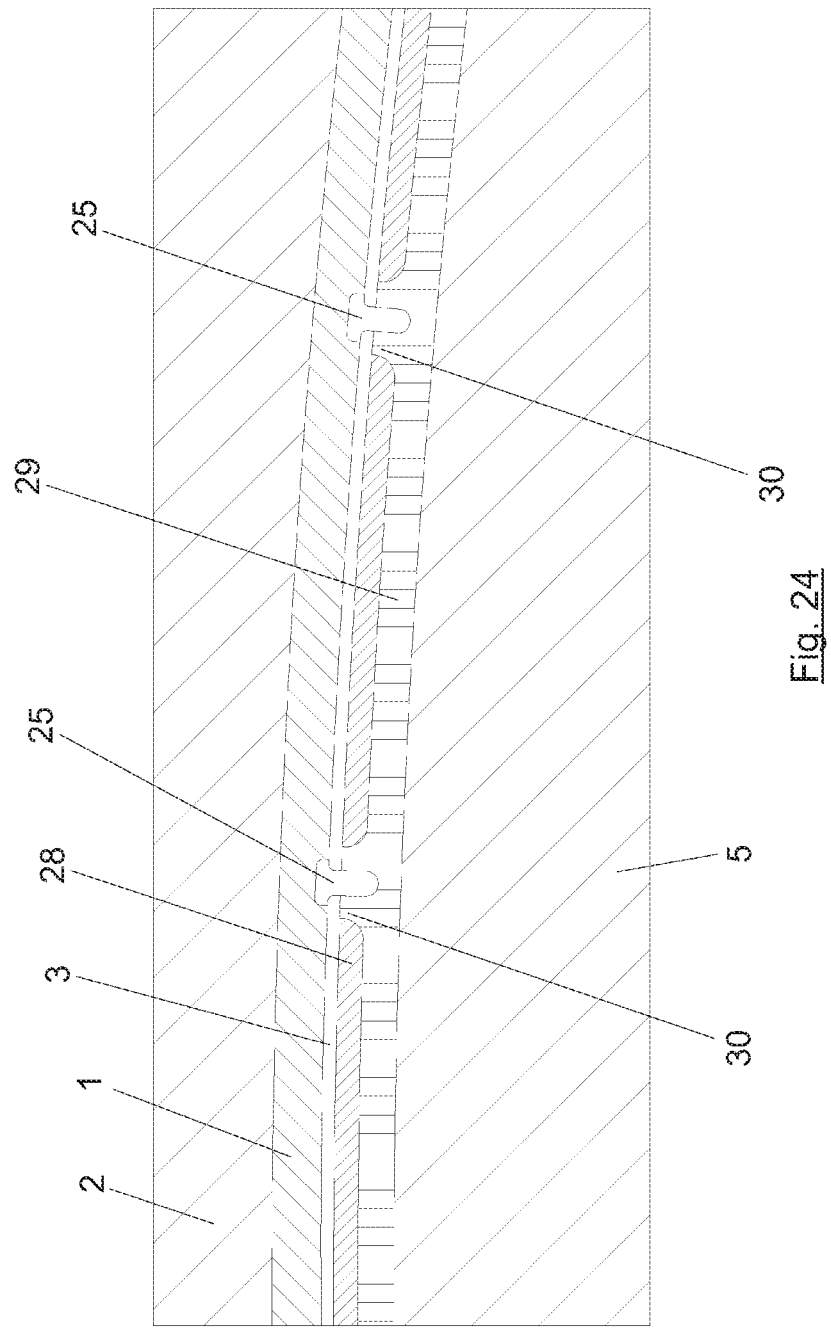

In a similar way, FIGS. 23 and 24 show how an automobile dashboard (27) is obtained. On the inner surface of the mould (2) the three-dimensional template (1), for example made of silicone, is arranged, which holds the laminar parts (3) which form the visible surface of the dashboard. On these laminar parts a foam layer (28) or similar is applied, for example open-cell foam, followed by a rigid or semi-rigid support (29), which has protrusions or ribs (30) that press against the laminar part (3) and the template (1), thereby obtaining a sealing that prevents the injected material that makes up the cords (25) for joining the laminar parts (3) from contaminating both said laminar parts as well as the foam layer (28). The process is completed with the counter-mould (5).

In the embodiments described, the cords (25) can form decorative elements of the product obtained, both by the tracing and the colour of the same.

The use of templates made from an elastically deformable material allows for the inclusion of parts that will form part of the cut or visible surface of the same and that will have a greater thickness than the separation between the template and the counter-mould.

Another advantage of the use of the template of elastically deformable material, with a certain thickness, is the ease it provides when opening the mould and extracting the counter-mould and the formed object.

Figure 25:
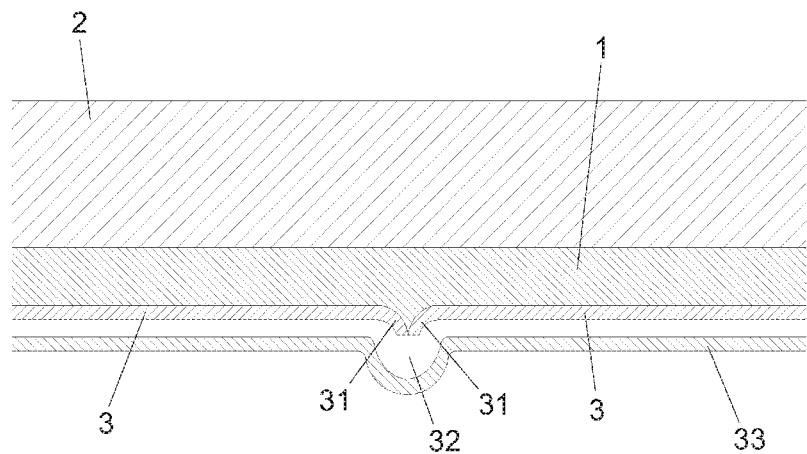
FIG. 25 shows a cross-sectional view of a possible variant embodiment.
Figure 26:
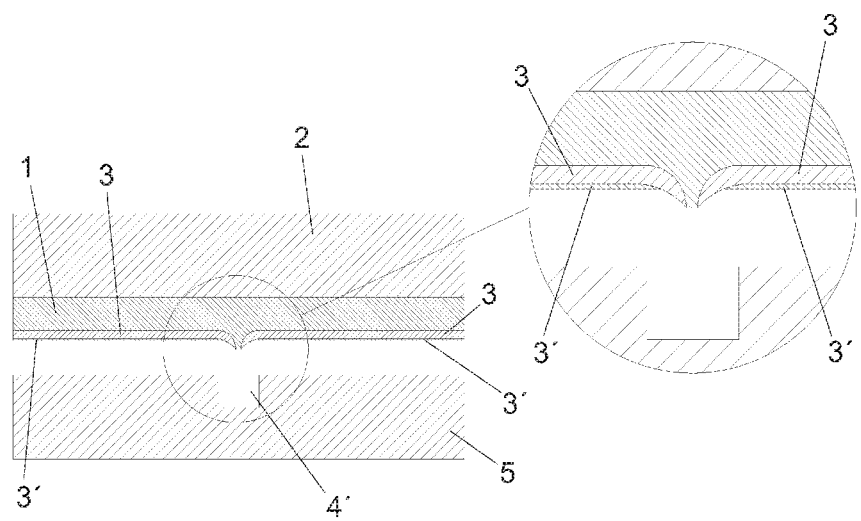
Figure 27:
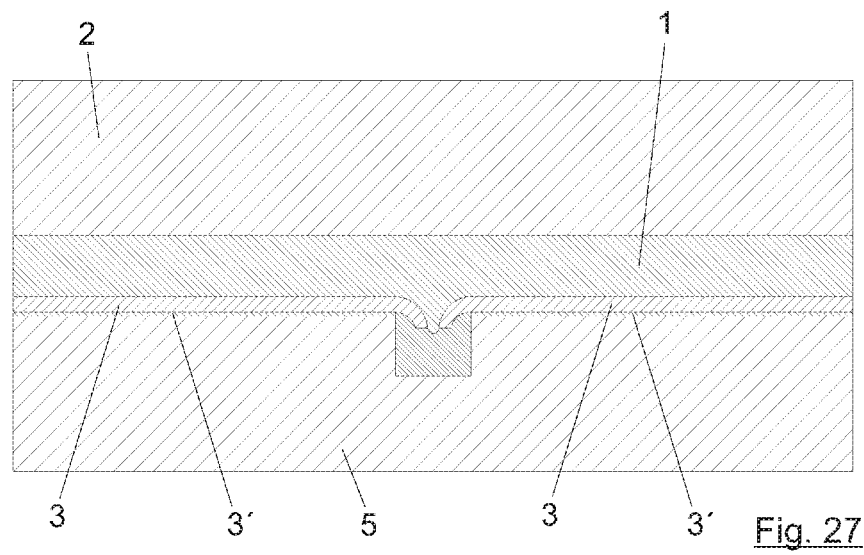
Figure 28:
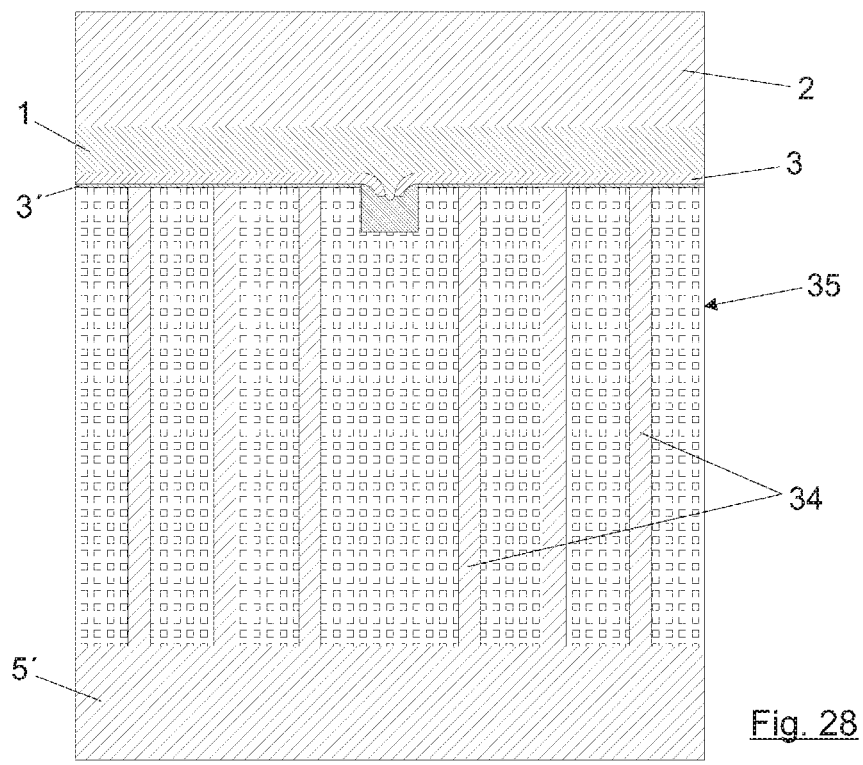

It is also worth pointing out that, as shown in FIG. 25, the facing edges of the adjacent laminar parts (3) can bend according to strips (31), which are attached and are inside a groove (32) formed in a cover (33), either rigid or semi-rigid, which acts as a counter-mould and covers the assembly of laminar parts. By means of these grooves (32), the adhesive material will be injected.

The grooves (32) can be longitudinally sealed, preventing the exit of the injected adhesive material, or open to allow for the exit of said material which, by solidifying, will form a layer of support for the visible layer formed by the laminar parts.

The cover (33) can be left out, the grooves thus (32) being made in the counter-mould.

In the described embodiment, the template (1) can also be left out, the laminar parts (3) being directly supported by the mould (2).

The method of the invention can be applied to the manufacturing of cushioned seats, for example seats for vehicles, as shown in FIGS. 26 to 29. In a first step, FIGS. 26 and 27, the laminar parts (3) are arranged on the three-dimensional template (1) and said template is mounted on the inner surface of the mould (2). The edges of the laminar parts (3) will preferably be recessed and housed in channels (4") formed in the counter-mould in which, in a first injection process, the adhesive product in charge of joining the facing edges of the adjacent laminar parts (3) will be injected. Once this adhesive product is cured, the counter-mould (5) is separated and a second counter-mould (5") is mounted, FIG. 28, which has needles (34) that rest against the laminar parts (3) with which they delimit a space (5), wherein, by means of a second injection process, a foam or similar product is injected, with which a shock-absorbing layer (36) will be obtained in the seat, behind the laminar parts (3), FIG. 29.

By dismounting the counter-mould (5"), the foam layer (36) will have perforations (37) for ventilation, thereby avoiding a subsequent perforation process.

The laminar parts (3) can be held, on the back, by a moisture insulating membrane (3), which must be eliminated on the edges of said parts, to allow for the joining by means of the injected adhesive material. This membrane can be arranged in the areas in which one wants an insulating separation between the foam layer (36) and the laminar parts (3).

Also, on the backside of the laminar parts, a repellent product can be applied to the injected material in the second injection step (foam or similar), with which an outer skin will be obtained, separated from the shock-absorbing layer (36).

The invention claimed is:

1. A method for manufacturing three-dimensional items with flexible walls comprising:
   obtaining a template having a shape of a three-dimensional item to be manufactured and having an inner surface;
   placing laminar parts forming the shape of the three-dimensional item to be manufactured on the inner surface of the template, the laminar parts having facing edges facing each other and being separated by channels between the laminar parts;
   coupling the template to the laminar parts and fixing to an inner surface of a mold;
   coupling a counter-mold on the laminar parts thereby closing the mold;
   injecting an adhesive material, in a fluid state, through a network of conduits delimited between the counter-mold, template and the facing edges of the laminar parts thereby joining the laminar parts; and
   reproducing, at least on the surface on which the laminar parts are arranged, the shape of the three-dimensional item to be manufactured,
   wherein the template is an elastically deformable material, of a greater thickness than a distance "D" between the mold and the flexible laminar parts, at least along areas that delimit the channels that separate the facing edges of adjacent laminar parts, and compresses the edges of said laminar parts against the counter-mold,
   wherein the template further comprises ribs that delimit the channels defined between the facing edges of the adjacent laminar parts.

2. The method according to claim 1, wherein the template has grooves that run in coincidence with the channels delimited between the facing edges of the adjacent laminar parts, and wherein the grooves are wider than said channels.

3. The method according to claim 2, wherein the grooves of the template are delimited by ribs along said grooves.

4. The method according to claim 1, wherein the facing edges of the adjacent laminar parts are recessed and are occluded in the adhesive material injected through the network of conduits defined between said facing edges and the surface of the template and the counter-mold.

5. The method according to claim 1, wherein the template is made of silicone.

6. The method according to claim 1, wherein at least over part of an inner surface of the counter-mold another template made from elastically deformable material is arranged.

7. The method according to claim 1, wherein the template has holes coinciding with a network of small channels of the mold, through which said holes are connected to a vacuum source.

8. The method according to claim 7, wherein the template, around the mouth of the holes, has a peripheral hollow in which a microfibre part is placed.

9. The method according to claim 1, wherein the laminar parts, close to the facing edges thereof, have holes that communicate with the network of conduits through which the adhesive material is injected.

10. The method according to claim 1, wherein the facing edges of the adjacent laminar parts bend according to strips that are attached and housed in grooves formed in the counter-mold.

11. The method according to claim 10, wherein the counter-mold is made up of a cover, in which the grooves are formed.

12. The method according to claim 11, wherein, in a position coinciding with a separation between the facing edges of the laminar parts, the counter-mold forms a channel that is filled with injected adhesive material and, when said material solidifies, said material forms reinforcement cords.

13. The method according to claim 1, wherein after the adhesive material is injected, the method further comprises:
   curing adhesive material;
   substituting the counter-mold with a second counter-mold, such that the laminar parts delimit a chamber;
   injecting a material and solidifying to form a shock-absorbing layer.

14. The method according to claim 13, wherein the counter-mold, on a surface facing the laminar parts, has needles that rest against said laminar parts and, by said counter-mold being separated, form ventilation perforations in the injected material.

15. The method according to claim 13, wherein a product that repels the material injected in the chamber is applied to a back side of the laminar parts.

16. The method according to claim 1, wherein a back side of the laminar parts hold a moisture insulating membrane.

* * * * *